United States Patent

Shimizu et al.

[11] Patent Number: 5,868,961
[45] Date of Patent: Feb. 9, 1999

[54] SILACYCLOHEXANE COMPOUND, A METHOD OF PREPARING IT AND A LIQUID CRYSTAL COMPOSITION CONTAINING IT

[75] Inventors: Takaaki Shimizu; Tsutomu Ogihara; Takeshi Kinsho; Tatsushi Kaneko; Ryuichi Saito, all of Nigata-ken; Hideshi Kurihara, Kanagawa, all of Japan

[73] Assignee: Shin-Etsu Chemical Co., Ltd., Tokyo, Japan

[21] Appl. No.: 514,085

[22] Filed: Aug. 11, 1995

Related U.S. Application Data

[63] Continuation-in-part of Ser. No. 262,542, Jun. 20, 1994, abandoned.

[30] Foreign Application Priority Data

Jun. 28, 1993 [JP] Japan ..................................... 5-181877

[51] Int. Cl.$^6$ .......................... C09K 19/34; C09K 19/06; C07F 7/08
[52] U.S. Cl. .................. 252/299.61; 252/299.6; 556/406
[58] Field of Search ........................ 252/299.61; 556/406

[56] References Cited

U.S. PATENT DOCUMENTS

| 2,607,791 | 3/1952 | Goodwin ........................ 556/406 X |
| 4,973,723 | 11/1990 | Cawthon et al. ................... 556/406 |
| 5,302,734 | 4/1994 | Jung et al. ........................ 556/406 |

FOREIGN PATENT DOCUMENTS 355008   2/1990   European Pat. Off. .

OTHER PUBLICATIONS

Ackerman et al., Liebigs Ann. Chem., 1979, 1915–24.

Primary Examiner—C. H. Kelly
Attorney, Agent, or Firm—Townsend & Banta

[57] ABSTRACT

A silacyclohexane compound represented by the following general formula (I).

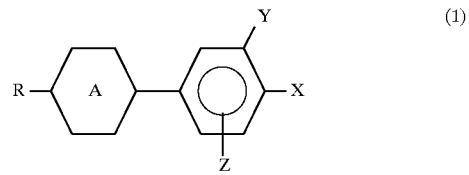

In this formula, R denotes a linear-chain alkyl group with 1–10 carbon atoms, a branched-chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms.

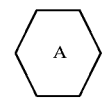

is trans-1-silacyclohexylene or trans-4-silacyclohexylene group whose silicon at position 1 or position 4 has a substitutional group(s) of H, F, Cl or $CH_3$. X denotes a R, OR, CN, F, Cl, $CF_3$, $CF_2$Cl, CHFCl, $OCF_3$, $OCHF_2$, $OCF_2$Cl, OCHFCl, $-(O)_m-CY_1=CX_1X_2$ (m denotes 0 or 1, $Y_1$ and $X_1$ respectively denote H, F or Cl, and $X_2$ denotes F or Cl) or $-O-C_rF_sH_{2r+1-s}$ is (r denotes an integral of 2 to 4 and s denotes an integral of 1 to 7) group. Y denotes H or F. Z denotes H or F.

7 Claims, No Drawings

SILACYCLOHEXANE COMPOUND, A METHOD OF PREPARING IT AND A LIQUID CRYSTAL COMPOSITION CONTAINING IT

This application is a continuation-in-part, of application Ser. No. 08/262,542 filed Jun. 20, 1994, now abandoned.

BACKGROUND OF THE INVENTION

1. Field of the Invention

This invention relates to a new silacyclohexane compound, a method of preparing it, and a liquid crystal composition which contains it as well as a liquid crystal display element which contains said liquid crystal composition.

2. The Prior Art

A liquid crystal display element utilizes the optical anisotropy and dielectric anisotropy of liquid crystal substances. Display methods include the TN mode (twisted nematic mode), the STN mode (super twisted nematic mode), the SBE mode (super birefringence mode), the DS mode (dynamic scattering mode), the guest-host mode, the DAP mode ("deformation of aligned phase" mode) and the OMI mode (optical mode interference mode). The most common display device has a twisted nematic structure based on the Schadt-Helfrich mode.

Properties required of the liquid crystal substance used in these liquid crystal displays are somewhat different depending on the display mode. However, a wide liquid crystal temperature range and stability against moisture, air, light, heat, electric fields, etc. are commonly required in all display methods. Furthermore, it is desirable for the liquid crystal material to have a low viscosity, and also to have a short address time, low threshold voltage and high contrast in the cell(s).

Currently, there is no single compound which satisfies all these requirements. In practice, liquid crystal mixtures are obtained by mixing several to more than ten liquid crystal compounds and liquid crystal like compounds. Because of this, it is also important that components of a liquid crystal composition mix easily each other.

Liquid crystal compounds which can be used as these components can be classified into the following categories:

1) Compounds which contribute to a reduction in viscosity and a lowering of the melting point of the mixed liquid crystal composition
2) Compounds which mainly control the electro-optical functions of the mixed liquid crystal composition
3) Compounds which contribute to raising the clearing point of the mixed liquid crystal composition
4) Compounds which contribute to refractive anisotropy of the mixed liquid crystal composition
5) Compounds which control the colored display and orientation of the mixed liquid crystal composition For compounds which belong to category 1) in this classification, compounds with so-called PCH structure such as

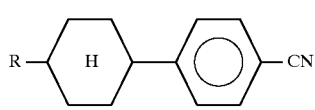

(Japanese examined patent publication (Tokko) Sho 56-38146),

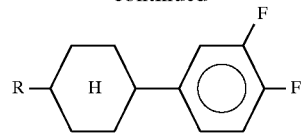

(Tokko Sho 64-373), and

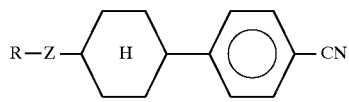

(Tokko Hei 1-38772)

have been known.

In recent years, along with the expansion of the applications of liquid crystal displays, the characteristics required of liquid crystal materials are becoming more and more advanced and demanding. In particular, superior characteristics such as improved low temperature performance, a wider temperature range for automobile onboard use and a lower driving voltage, compared with conventional liquid crystal substances, are desired.

BRIEF SUMMARY OF THE INVENTION

From such a viewpoint, this invention is a newly developed liquid crystal substance targeting improvement in the characteristics of compounds which contribute to a reduction in viscosity and a lowering of the melting point of the mixed liquid crystal composition, and its object is to provide a liquid crystal compound containing silacyclohexane rings, which is completely different from the conventional liquid crystal compounds with the PCH structure.

This invention provides a silacyclohexane compound represented by the following general formula (I):

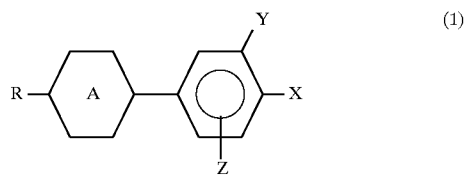

wherein R denotes a linear-chain alkyl group with 1–10 carbon atoms, a branched-chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms,

is trans-1-silacyclohexylene or trans-4-silacyclohexylene group whose silicon at position 1 or position 4 has a substitutional group(s) of H, F, Cl or $CH_3$, X denotes a R, OR, CN, F, Cl, $CF_3$, $CF_2$ Cl, $CHFC_1$, $OCF_3$, $OCHF_2$, $OCF_2Cl$, OCHFCl, $-(O)_m-CY_1=CX_1X_2$ (m denotes 0 or 1, $Y_1$ and $X_1$ respectively denote H, F or Cl, and $X_2$ denotes F or Cl.) or $-O-C_rF_sH_{2r+1-s}$ (r denotes an integral of 2 to 4 and s denotes an integral of 1 to 7.) group, Y denotes H or F, and Z denotes H or F.

This invention also provides a silacyclohexane compound represented by the general formula (I) wherein said compound is used as a component in a liquid crystal composition.

This invention also provides a method of preparing the silacyclohexane compound:

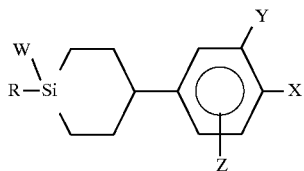

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a H, F, Cl or $CH_3$ group, X denotes a R, OR, CN, F, Cl, $CF_3$, $CF_2$, CHFCl, $OCF_3$, $OCHF_2$, $OCF_2$, $OCF_2Cl$, OCHFCl, $—(O)_m—CY_1=CX_1X_2$ (m denotes 0 or 1, $Y_1$ and $X_1$ respectively denote H, F or Cl, and $X_2$ denotes F or Cl.) or $—O—C_rF_sH_{2r+1-s}$ (r denotes an integral of 2 to 4 and s denotes an integral of 1 to 7.) group, Y denotes H or F, and Z denotes H or F;

comprising reacting an organometallic reagent:

R—M where M denotes MgP, ZnP or Li, and P denotes a halogen atom which is preferably Cl, Br or I, with a silacyclohexane compound:

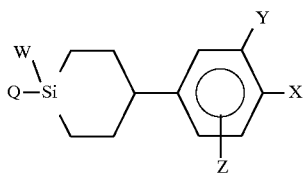

wherein Q denotes a halogen which is preferably Cl or Br, or alkoxy group.

This invention also provides a method of preparing the silacyclohexane compound:

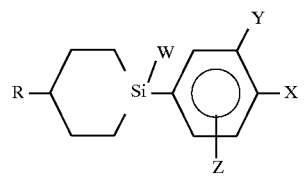

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a R, OR, H, F, Cl or $CH_3$ group, X denotes a R, OR, CN, F, Cl, $CF_3$, $CF_2$, CHFCl, $OCF_3$, $OCHF_2$, $OCF_2$, $OCF_2Cl$, OCHFCl, $—(O)_m—CY_1=CX_1X_2$ (m denotes 0 or 1, $Y_1$ and $X_1$ respectively denote H, F or Cl, and $X_2$ denotes F or Cl.) or $—O—C_rF_sH_{2r+1-s}$ (r denotes an integral of 2 to 4 and s denotes an integral of 1 to 7.) group, Y denotes H or F, and Z denotes H or F;

comprising reacting an organometallic reagent:

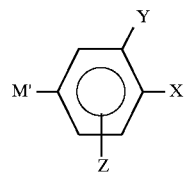

wherein M' denotes MgP', ZnP' or Li, and P' denotes a halogen atom which is preferably Br or I when X is Cl and preferably Cl, Br or I when X is not Cl, with a silacyclohexane compound:

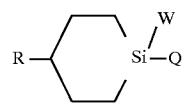

wherein Q denotes a halogen which is preferably Cl or Br, or alkoxy group which is preferably an alkoxyl group with 1–4 carbon atoms.

This invention also provides a method of preparing the silacyclohexane compound:

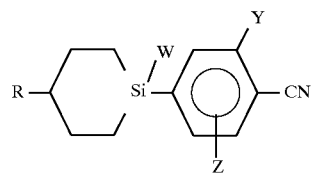

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a H, F, Cl or $CH_3$ group, Y denotes H or F, and Z denotes H or F;

comprising reacting an organometallic reagent:

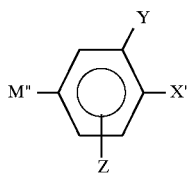

wherein M" denotes MgP", ZnP" or Li, P" denotes a Br or I atom, and X' denotes a halogen atom which is preferably Cl or Br, with a silacyclohexane compound:

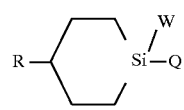

wherein Q denotes a halogen which is preferably Cl or Br, or alkoxy group which is preferably an alkoxyl group with 1–4 carbon atoms, to obtain a phenylsilacyclohexane compound:

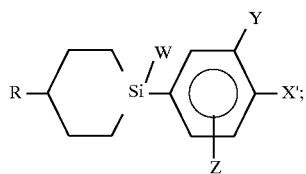

forming a Grignard reagent:

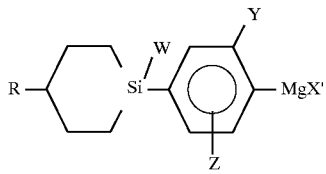

from said phenylsilacyclohexane compound by applying Mg thereto; and reacting a cyanation reagent:

T—CN wherein T denotes a halogen which is preferably Cl or Br, or a cyano group with said Grignard reagent.

Further, this invention provides a liquid crystal composition characterized by containing the compound represented by the general formula (I) and a liquid crystal display element comprising the liquid crystal composition.

DETAILED DESCRIPTION

The molecular structuire of the silacyclohexane compounds according to the present invention includes a silacyclohexane ring and a phenyl ring. The compounds contribute to a reduction in viscosity and a lowering of the melting point of the mixed liquid crystal composition. The reduction in viscosity of the mixed liquid crystal composition contributes to a faster display speed. However, some of the compositions have insufficient liquid crystal properties.

The compounds according to the present invention are classified to two groups (a) and (b).

(a) The compounds which exhibit enantiotropic phase transition

These compounds have phase transition properties as follows:

(Isothermal changes)

Crystal→Nematic liquid crystal phase→Isotropic liquid (Cooling changes)

Isotropic liquid→Nematic liquid crystal phase→Crystal

The nematic-isotropic transition temperature $T_{NI}$ of the compounds of the group (a) is always higher than the crystal-nematic transition temperature $T_{CN}$.

(b) The compounds which exhibit monotropic phase transition

The compounds of the group (b) are further classified to two groups (b-1) and (b-2).

(b-1)

The compounds of this group exhibit only transition from crystal phase to isotropic liquid phase when the temperature increases. However, the compounds of this group have a tendency to be supercooled transit to nematic liquid crystal phase from isotropic liquid phase during supercooling state when the temperature decreases lower than the crystal-isotropic transition temperature $T_{CI}$. When the temperature further decreases, some of the compounds show no phase transition from nematic liquid crystal to crystal and some other show the phase transition where the phase transition temperatures change in every measuring timing.

(b-2)

The compounds of this group exhibit only transition between crystal phase and isotropic liquid phase whether the temperature increases or decreases. Accordingly, the compounds seem to exhibit the same properties as non-liquid crystal compounds and to have no nematic-isotropic phase transition temperature $T_{NI}$. However, a virtual nematic-isotropic phase transition temperature $T_{NI}$ which is lower than the crystal-isotropic liquid phase transition temperature $T_{CI}$ can be calculated using a two-component phase diagram of the compounds of the groups (a) and (b-2) by extrapolation. Non-liquid crystal compounds do not has even a virtual nematic-isotropic phase transition temperature $T_{NI}$. Therefore, the compounds of this group can be called as "potential liquid crystal compounds".

The compounds of the groups (b-1) and (b-2) have $T_{NI}$ lower than $T_{CI}$.

The compounds of the group (b) as well as (a) are useful for liquid crystal compositions as components which exhibit enantiotropic phase transition, as will be understood by the examples of the liquid crystal compositions described after.

The new compounds represented by the general formula (I) are new silacyclohexane compounds whose ring structure has a trans-1 or 4-silacyclohexane ring, specifically represented by ring structures shown below:

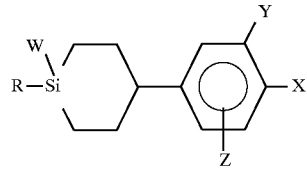

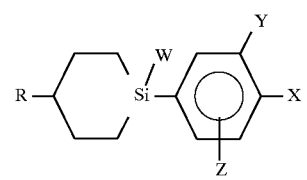

In these formulas, R denotes a linear-chain alkyl group with 1–10 carbon atoms, i.e. a methyl, ethyl, n-propyl, n-butyl, n-pentyl, n-hexyl, n-heptyl, n-octyl, n-nonyl or n-decyl group, or a branched-chain alkyl group with 3–8 carbon atoms, i.e. isopropyl, sec-butyl, iso-butyl, 1-methylbutyl, 2-methylbutyl, 3-methylbutyl, 1-methylpentyl, 2-methylpentyl, 3-methylpentyl, 1-ethylpentyl, 1-methylhexyl, 2-methylhexyl, 3-methylhexyl, 2-ethylhexyl, 3-ethylhexyl, 1-methylheptyl, 2-methylheptyl or 3-methylheptyl group, or a mono- or di-fluoroalkyl group with 1–10 carbon atoms, i.e. fluoromethyl, 1-fluoroethyl, 1-fluoropropyl, 1-fluorobutyl, 1-fluoropentyl, 1-fluorohexyl, 1-fluoroheptyl, 1-fluorooctyl, 1-fluorononyl, 1-fluorodecyl, 2-fluoroethyl, 2-fluoropropyl, 2-fluorobutyl, 2-fluoropentyl, 2-fluorohexyl, 2-fluoroheptyl, 2-fluorooctyl, 2-fluorononyl, 2-fluorodecyl, 3-fluoropropyl, 3-fluorobutyl, 3-fluoropentyl, 3-fluorohexyl, 3-fluoroheptyl, 3-fluorooctyl, 3-fluorononyl, 3-fluorodecyl, 4-fluorobutyl, 4-fluoropentyl, 4-fluorohexyl, 4-fluoroheptyl, 4-fluorooctyl, 4-fluorononyl, 4-fluorodecyl, 5-fluoropentyl, 5-fluorohexyl, 5-fluoroheptyl, 5-fluorooctyl, 5-fluorononyl, 5-fluorodecyl, 6-fluorohexyl, 6-fluoroheptyl, 6-fluorooctyl, 6-fluorononyl, 6-fluorodecyl, 7-fluoroheptyl, 7-fluorooctyl, 7-fluorononyl, 7-fluorodecyl, 8-fluorooctyl, 8-fluorononyl, 8-fluorodecyl, 9-fluorononyl, 9-fluorodecyl, 10-fluorodecyl, difluoromethyl, 1,1-difluoroethyl, 1,1-difluoropropyl, 1,1-difluorobutyl, 1,1-difluoropentyl, 1,1-difluorohexyl, 1,1-difluoroheptyl, 1,1-difluorooctyl, 1,1-difluorononyl, 1,1-difluorodecyl, 2,2-difluoroethyl, 2,2-difluoropropyl, 2,2-difluorobutyl, 2,2-difluoropentyl, 2,2-difluorohexyl, 2,2-difluoroheptyl, 2,2-difluorooctyl, 2,2-difluorononyl, 2,2-difluorodecyl, 3,3-difluoropropyl, 3,3-difluorobutyl, 3,3-difluoropentyl, 3,3-difluorohexyl, 3,3-difluoroheptyl, 3,3-difluorooctyl, 3,3-difluorononyl, 3,3-difluorodecyl, 4,4-difluorobutyl, 4,4-difluoropentyl, 4,4-difluorohexyl, 4,4-difluoroheptyl, 4,4-difluorooctyl, 4,4-difluorononyl, 4,4-difluorodecyl, 5,5-difluoropentyl, 5,5-difluorohexyl, 5,5-difluoroheptyl, 5,5-difluorooctyl, 5,5-difluorononyl, 5,5-difluorodecyl, 6,6-difluorohexyl, 6,6-difluoroheptyl, 6,6-difluorooctyl, 6,6-difluorononyl, 6,6-difluorodecyl, 7,7-difluoroheptyl, 7,7-difluorooctyl, 7,7-difluorononyl, 7,7-difluorodecyl, 8,8-difluorooctyl, 8,8-difluorononyl, 8,8-difluorodecyl, 9,9-difluorononyl, 9,9-difluorodecyl or 10,10-difluorodecyl group, or an alkoxyalkyl group with 2–7 carbon atoms, i.e. a methoxymethyl, ethoxymethyl, propoxymethyl, butoxymethyl, pentoxymethyl, hexyloxymethyl, methoxyethyl, ethoxyethyl, propoxyethyl, butoxyethyl, pentoxyethyl, methoxypropyl, ethoxypropyl, propoxypropyl, butoxypropyl, methoxybutyl, ethoxybutyl, propoxybutyl, methoxypentyl or ethoxypentyl group, or an alkenyl group with 2–8 carbon atoms, i.e. a vinyl, 1-propenyl, allyl, 1-butenyl, 3-butenyl, isoprenyl, 1-pentenyl, 3-pentenyl, 4-pentenyl, dimethylallyl, 1-hexenyl, 3-hexenyl, 5-hexenyl, 1-heptenyl, 3-heptenyl, 6-heptenyl or 7-octenyl group.

W denotes H, F, Cl or $CH_3$. X denotes a R, OR, CN, F, Cl, $CF_3$, $CF_2Cl$, CHFCl, $OCF_3$, $OCHF_2$, $OCF_2Cl$, OCHFCl, $-(O)_m-CY_1=CX_1X_2$ (m denotes 0 or 1, $Y_1$ and $X_1$ respectively denote H, F or Cl, and $X_2$ denotes F or Cl) or $-OC_rF_sH_{2r+1-s}$ (r denotes an integral of 2 to 4 and s denotes an integral of 1 to 7) group. Y denotes H or F. Z denotes H or F.

The partial structure

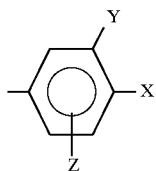

specifically denotes either of the following groups:

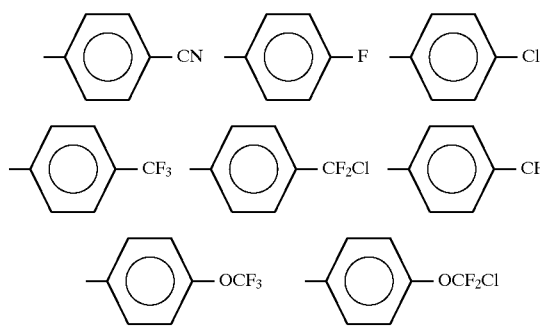

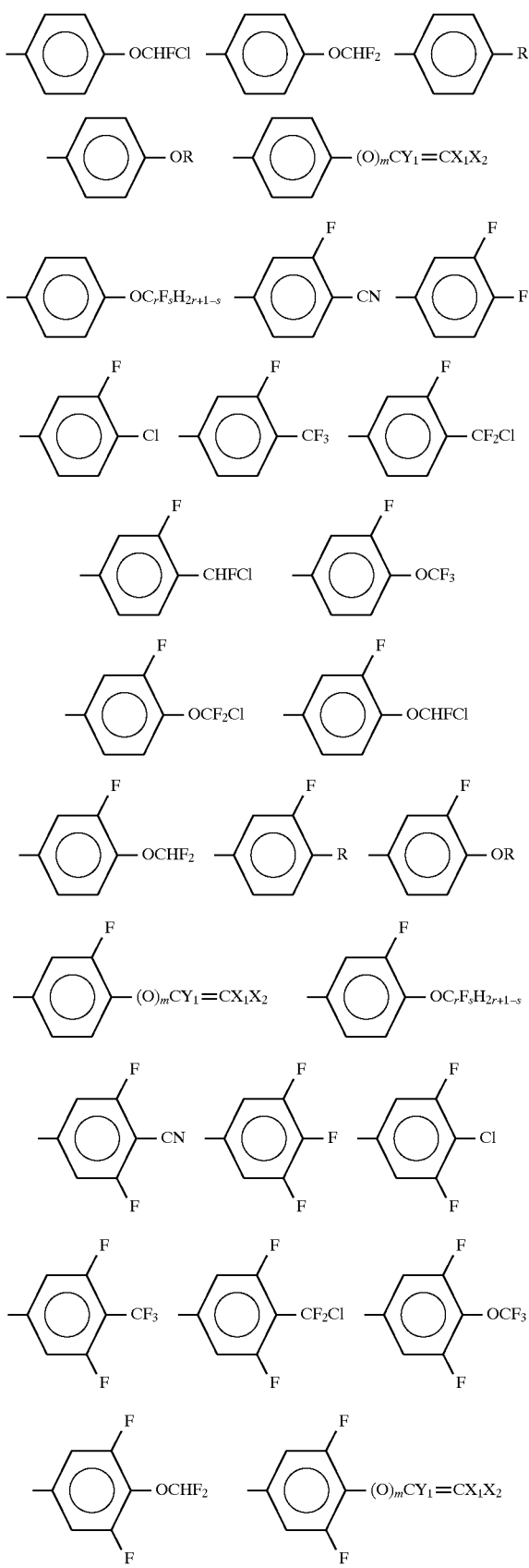

-continued

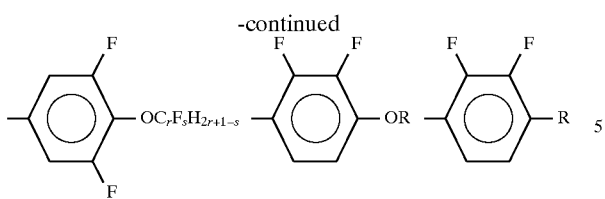

For R, the following groups are desirable for practical use: a linear-chain alkyl group with 3–7 carbon atoms, i.e. a n-propyl, n-butyl, n-pentyl, n-hexyl or n-heptyl group, or some branched-chain alkyl groups with 3–7 carbon atoms including isopropyl, 1-methylpropyl, 2-methylpropyl, 1-methylbutyl, 2-methylbutyl, 3-methylbutyl, 1-methylpentyl, 2-methylpentyl and 2-ethylhexyl groups, or some mono- or di-fluoroalkyl groups with 1–10 carbon atoms including 2-fluoroethyl, 2-fluoropropyl, 2-fluorobutyl, 2-fluoropentyl, 2-fluorohexyl, 2-fluoroheptyl, 4-fluorobutyl, 4-fluoropentyl, 4-fluorohexyl, 4-fluoroheptyl, 4-fluorooctyl, 4-fluorononyl, 4-fluorodecyl, 5-fluoropentyl, 5-fluorohexyl, 5-fluoroheptyl, 6-fluorohexyl, 6-fluoroheptyl, 7-fluoroheptyl, 2,2-difluoroethyl, 2,2-difluoropropyl, 2,2-difluorobutyl, 2,2-difluoropentyl, 2,2-difluorohexyl, 2,2-difluoroheptyl, 4,4-difluorobutyl, 4,4-difluoropentyl, 4,4-difluorohexyl, 4,4-difluoroheptyl, 4,4-difluorooctyl, 4,4-difluorononyl, 4,4-difluorodecyl, 5,5-difluoropentyl, 5,5-difluorohexyl, 5,5-difluoroheptyl, 6,6-difluorohexyl, 6,6-difluoroheptyl and 7,7-difluoroheptyl groups, or an alkoxyalkyl group with 2–6 carbon atoms, i.e. a methoxymethyl, methoxyethyl, methoxypropyl, methoxypentyl, ethoxymethyl, ethoxyethyl, propoxymethyl or pentoxymethyl group, or some alkenyl groups including vinyl, 1-propenyl, 3-butenyl, 1-pentenyl, 3-pentenyl, 4-pentenyl, 1-hexenyl, 5-hexenyl, 6-heptenyl and 7-octenyl groups.

H, F and $CH_3$ groups are desirable for W in practical use.

However, if the ring structure of the silacyclohexane ring is

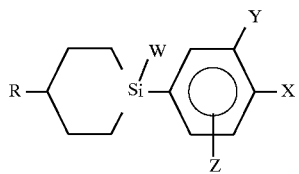

and also X is a CN compound, then the choice of W is limited to an H or a $CH_3$ group.

In practical use for the partial structure

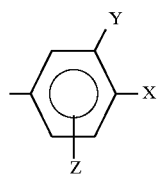

the compounds shown below are desirable.

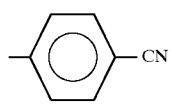

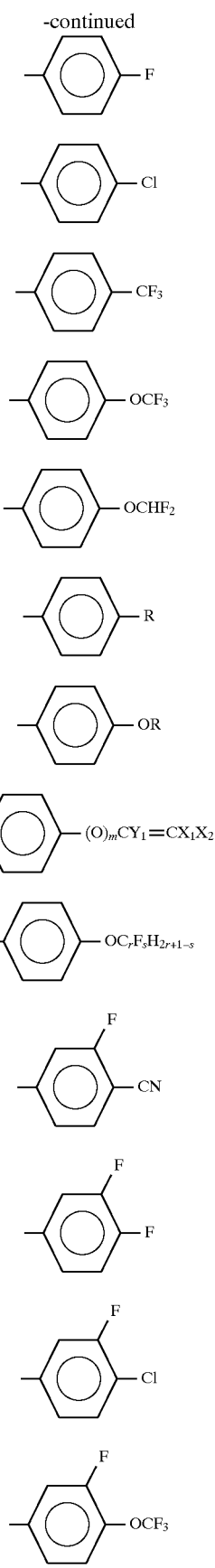

-continued

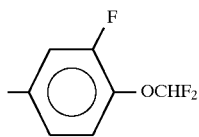

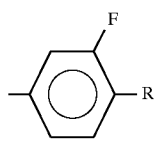

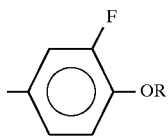

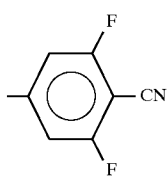

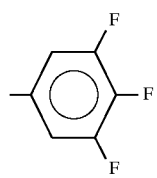

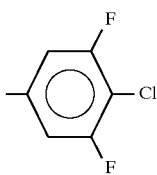

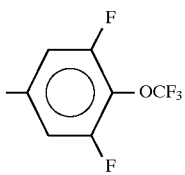

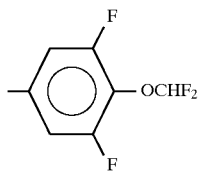

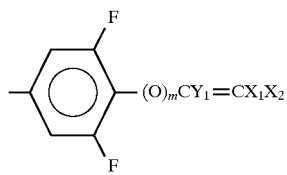

-continued

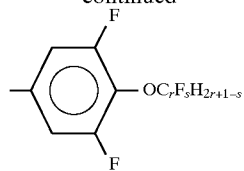

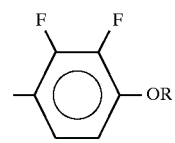

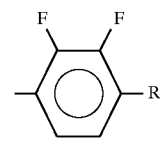

Methods of preparing these compounds are described below.

(1) A method of preparing the compound of this invention when the ring structure of the silacyclohexane ring is

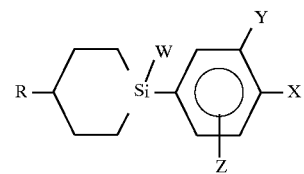

and X is CN

In this preparation method, p-halobromobenzene or p-haloiodobenzene with substitutional groups Y and Z is brought into reaction with magnesium metal in a solvent such as THF (tetrahydrofuran) to obtain the corresponding Grignard reagent. The reagent thus produced is then brought into reaction with a silacyclohexane compound whose silicon has the substitutional groups W and Q. The product is again brought into reaction with magnesium metal in a solvent such as THF (tetrahydrofuran) to prepare Grignard reagent, which is then brought into reaction with a cyanation reagent such as cyanogen. The compound produced here is a mixture of trans and cis isomers in terms of the conformation of the silacyclohexane ring. A conventional purification means such as chromatography and recrystallization is employed to separate and purify the trans isomer to obtain the silacyclohexane compound of this invention represented by the general formula (I). The reaction formula is shown below.

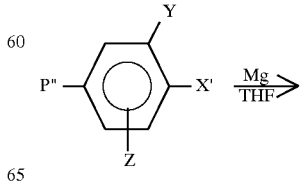

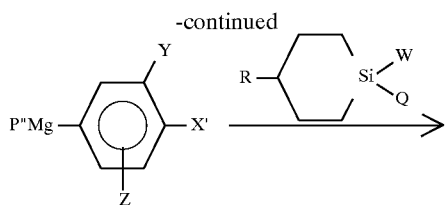

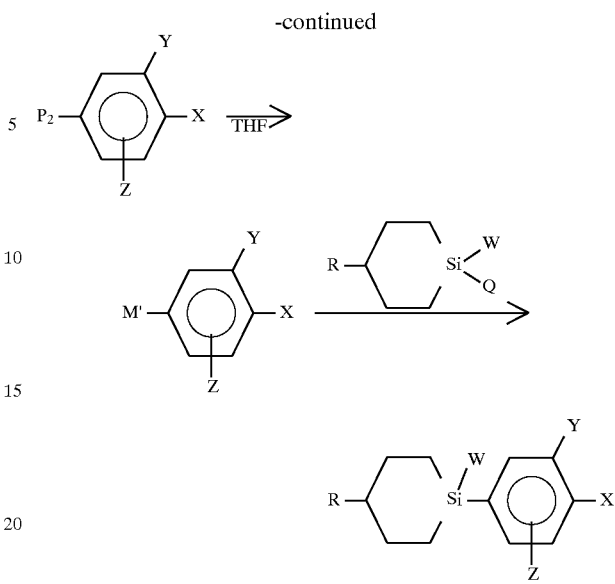

(P'': Br or I; X': Halogen; Q: Halogen, alkoxy group)

(2) A method of preparing the compound of this invention other than (1) as described above Although the reaction substrates are somewhat different depending on the ring structure, all of them are prepared using the organometallic coupling reactions shown below.

In this preparation method, the organometallic reagent is prepared from the corresponding R-halide or the aryl halide in a solvent such as THF (tetrahydrofuran) in a conventional manner. The organometallic reagent thus prepared is then brought into reaction with a silacyclohexane compound whose silicon has the substitutional groups W and Q. The compound produced here is a mixture of trans and cis isomers in terms of the conformation of the silacyclohexane ring. A conventional purification means such as chromatography and recrystallization is employed to separate and purify the trans isomer to obtain the silacyclohexane compound of this invention represented by the general formula (I). The reaction formula is shown below.

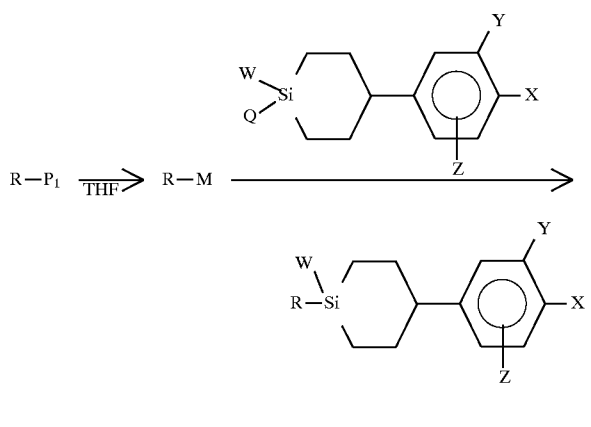

{M denotes $MgP_1$, $ZnP_1$ or Li, $P_1$ denotes a halogen which is preferably Cl, Br or I, M' denotes $MgP_2$, $ZnP_2$ or Li, and $P_2$ denotes Br or I (when X is Cl), or Cl, Br or I (when X is not Cl). Q denotes a halogen or alkoxy group. W denotes a H, F, Cl or $CH_3$ group. X denotes a R, OR, CN, F, Cl, $CF_3$, $CF_2Cl$, $CHFCl$, $OCF_3$, $OCHF_2$, $OCF_2Cl$, $OCHFCl$, $—(O)_m—CY_1=CX_1X_2$ (m denotes 0 or 1, $Y_1$ and $X_1$ respectively denote H, F or Cl, and $X_2$ denotes F or Cl.) or $—O—C_rF_sH_{2r+1-s}$ (r denotes an integral of 2 to 4 and s denotes an integral of 1 to 7.) group. Y denotes H or F. Z denotes H or F. If W=F or Cl, then W=Q.}

The silacyclohexane compound of this invention can be mixed with known compounds to obtain a liquid crystal composition. The compound used for mixing to obtain the liquid crystals compound can be chosen from among the known compounds shown below:

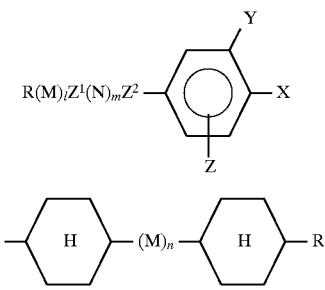

In the above foumulas, (M) and (N) denote one of the following:

1) A trans-1,4-cyclohexylene group which has no substitution or which has one or more substitutional groups such as F, Cl, Br, CN or alkyl groups,
2) A ring comprising a cyclohexane ring in which O or S is substituted for one or nonadjacent two $CH_2$ groups,
3) A 1,4-cyclohexenylene group,
4) A 1,4-phenylene group which has no substitution or which has one or two substitutional groups such as F, Cl, $CH_3$ or CN groups, or
5) A ring comprising a 1,4-phenylene group in which an N atom is substituted for one or two CH groups.

$Z^1$ and $Z^2$ denote $—CH_2CH_2—$, $—CH=CH—$, $—C—C≡$, $—CO_2—$, $—OCO—$, $—CH_2O—$, $—OCH_2—$ or a single bond.

1, m=0, 1 or 2 (where l+m=1, 2 or 3, and n=0, 1 or 2)

R denotes hydrogen, a linear-chain alkyl group with 1–10 carbon atoms, a branched-chain alkyl group with a carbon number of 3–8, an alkoxyalkyl group with 2–7 carbon atoms, or an alkenyl group with 2–8 carbon atoms.

X, Y and Z are the same as defined for the general formula (I).

In the above description, if l or n=2, then (M) can contain heterogeneous rings, and if m=2, then (N) can contain heterogeneous rings.

The ratio of one or more types of the silacyclohexane compound of this invention contained in the liquid crystal composition is 1–50 wt %, more preferably 5–30 wt %. The liquid crystal composition can also contain a polygenetic dye(s) to generate the colored guest-host system and additives to change the dielectric anisotropy, viscosity and the orientation of the nematic phase.

The liquid crystal composition thus formed can be used to manufacture various liquid crystal display elements in conventional methods. That is, the liquid crystal composition containing the silacyclohexane compound of this invention is sealed between transparent plates which have electrodes of desired shapes and thus used as liquid crystal display elements. This element can have various undercoatings, overcoatings for the orientation control, a polarizer plate(s), a filter(s) and a reflector layer(s), as necessary. It can be made into a laminated cell or combined with other display elements. Semiconductor substrates and light sources can also be used to make various types of displays.

For the mode of the liquid crystal display element, prior-art methods in the industry of liquid crystal display elements, such as the dynamic scattering (DSM) method, the twisted nematic (TN) method, the guest-host (GH) method, the super twisted nematic (STN) method and the polymer dispersion liquid crystal (PDLC) method can be adopted.

EXAMPLES

The details of this invention is described below by referring to specific examples.

[Example 1]

Preparation of 4-(trans-4-n-heptyl-4-silacyclohexyl) benzonitrile 3.6 g (20 mmol) of 1-bromo-n-heptane was dropped into a mixture of 0.5 g of magnesium (21 mmol) and 50 ml of tetrahydrofuran (THF) to obtain Grignard reagent. This solution was then added to a mixture of 2.8 g of zinc chloride and 20 ml of THF to obtain the organozinc reagent. This solution was then dropped into a 50 ml THF solution of 4.7 g (20 mmol) of 4-(4-chloro -4-silacyclohexyl) benzonitrile to obtain 4-(4-n-heptyl -4-silacyclohexyl) benzonitrile.

The product was a mixture of trans and cis isomers. They were separated by means of chromatography to obtain 5. 5 g of the trans isomer (yield 92%).

C—N transition temperature: 16° C., N—I transition temperature: 19° C.

IR (liquid film) $v_{max}$: 2920, 2227, 2100, 1608, 1502, 1458, 1408, 1184, 987, 893, 889 and 820 cm$^{-1}$.

The following compounds were obtained in the same manner as Example 1.

[Example 2]

4-(trans-4-n-pentyl-4-silacyclohexyl) benzonitrile

C—I transition temperature: 38° C., N—I transition temperature: 13° C.

IR (liquid film) $v_{max}$: 2920, 2227, 2104, 1608, 1502, 1458, 1408, 987, 881 and 825 cm$^{-1}$.

[Example 3]

4-(trans-4-n-hexyl-4-silacyclohexyl) benzonitrile

C—I transition temperature: 18° C., N—I transition temperature: 10° C.

IR (liquid film) $v_{max}$ : 2920, 2227, 2100, 1608, 1502, 1458, 1407, 1184, 987, 889, 879 and 817 cm$^{-1}$.

[Example 4]

4-(trans-4-n-nonyl-4-silacyclohexyl) benzonitrile

C—I transition temperature: 32° C., N—I transition temperature: 25° C.

IR (liquid film) $v_{max}$: 2916, 2225, 2090, 1606, 1502, 1470, 1406, 989, 933, 889 and 812 cm–1.

[Example 5]

Preparation of 4-(trans-4-n-heptyl-4-silacyclohexyl) -1,2-difluorobenzene 3.0 g (20 mmol) of 1-bromo-n-heptane was dropped into a mixture of 0.5 g of magnesium (21 mmol) and 50 ml of THF to obtain Grignard reagent. This reagent was then dropped into a 50 ml THF solution of 4.9 g (20 mmol) of 4-(4-chloro -4-silacyclohexyl)-1,2-difluorobenzene to obtain 4-(4-n-heptyl -4-silacyclohexyl)-1,2-difluorobenzene. The product was a mixture of trans and cis isomers. They were separated by means of chromatography to obtain 5.3 g of the trans isomer (yield 93%).

C—I transition temperature: −17° C.

IR (liquid film) $v_{max}$: 2920, 2102, 1517, 1431, 1407, 1284, 1213, 1114, 987, 960, 889 and 811 cm$^{-1.}$ The following compounds were obtained in the same manner as Example 5.

[Example 6]

4-(trans-4-n-heptyl-4-silacyclohexyl)-1-fluorobenzene
C—I transition temperature: 11° C.

IR (liquid film) $v_{max}$: 2920, 2100, 1510, 1458, 1408, 1228, 985, 887 and 820 cm$^{-1}$.

[Example 7]

4-(trans-4-n-pentyl-4-silacyclohexyl)-1-fluorobenzene

C—I transition temperature: 2° C.

IR (liquid film) $v_{max}$: 2920, 2100, 1510, 1458, 1408, 1228, 987, 887 and 825 cm$^{-1}$.

[Example 8]

4-(trans-4-n-hexyl-4-silacyclohexyl)-1-fluorobenzene

C—I transition temperature: 8° C.

IR (liquid film) $v_{max}$: 2920, 2100, 1510, 1458, 1408, 1228, 1159, 987, 887 and 816 cm$^{-1}$. [Example 9]

4-(trans-4-n-pentyl-4-silacyclohexyl)-1-chlorobenzene

C—I transition temperature: 9° C.

IR (liquid film) $v_{max}$: 2920, 2110, 1495, 1465, 1415, 1095, 990, 880 and 815 cm$^{-1}$.

[Example 10]

4-(trans-4-n-hexyl-4-silacyclohexyl)-1-chlorobenzene

C—I transition temperature: 35° C.

IR (liquid film) $v_{max}$: 2920, 2100, 1495, 1460, 1410, 1180, 1095, 985, 880 and 805 cm$^{-1}$.

[Example 11]

4-(trans-4-n-heptyl-4-silacyclohexyl)-1-chlorobenzene

C–I transition temperature: 23° C.

GC-MS (70 eV) (m/z)+: 127, 154, 209, 252, 280 and 308.

[Example 12]

4-(trans-4-n-octyl-4-silacyclohexyl)-1-chlorobenzene

C—I transition temperature: 43° C.

IR (KBr) $v_{max}$: 2920, 2100, 1495, 1460, 1410, 1090, 985, 880 and 805 cm$^{-1}$.

[Example 13]

4-(trans-4-n-nonyl-4-silacyclohexyl)-1-chlorobenzene

C—I transition temperature: 41° C.

IR (liquid film) $v_{max}$: 2925, 2100, 1495, 1460, 1410, 1095, 990, 880 and 815 cm$^{-1}$.

[Example 14]

4-(trans-4-n-heptyl-4-silacyclohexyl)-1-trifluoromethoxybenzene

[Example 15]

4-(trans-4-isopentyl-4-silacyclohexyl)-1-methoxybenzene

[Example 16]

4-(trans-4-methoxypentyl-4-fluoro-4-silacyclohexyl)-1-chloro-2-fluorobenzene

[Example 17]

4-(trans-4-methoxypentyl-4-methyl-4-silacyclohexyl)-1,2,6-trifluorobenzene

[Example 18]

4-(trans-4-(3-pentenyl)-4-methyl-4-silacyclohexyl)-1-trifluoromethoxy-2-fluorobenzene

[Example 19]

4-(trans-4-(3-methoxypropyl)-4-silacyclohexyl)-1-fluorobenzene

C—I transition temperature: 5.9° C.

IR (liquid film) $v_{max}$: 2922, 2852, 2100, 1604, 1508, 1225, 1117, 887 and 818 cm$^{-1}$.

[Example 20]

4-(trans-4-(E-3-hexenyl)-4-silacyclohexyl)-1-fluorobenzene

C—I transition temperature: −90° C.

IR (liquid film) $v_{max}$: 2962, 2916, 2102, 1604, 1510, 1228, 1159, 985, 966, 887 and 818 cm$^{-1}$.

[Example 21]

4-(trans-4-(3-methylbutyl)-4-silacyclohexyl)-1-fluorobenzene

C—I transition temperature: 5.7° C.

IR (liquid film) $v_{max}$: 2954, 2916, 2100, 1606, 1510, 1228, 1159, 987, 889 and 812 cm$^{-1}$.

[Example 22]

4-(trans-4-n-pentyl-1-silacyclohexyl)-2,3-difluoro-1-ethoxybenzene

[Example 23]

Preparation of 4-(trans-4-n-pentyl-1-silacyclohexyl) benzonitrile

A 5 ml THF solution of 3.8 g (20 mmol) of 4-bromochlorobenzene was dropped into a mixture of 0.5 g of magnesium (21 mmol) and 50 ml of THF to obtain Grignard reagent. This reagent was then dropped into a 50 ml THF solution of 4.1 g (20 mmol) of 4-n-pentyl-1-chloro-1-silacyclohexane to obtain 5.5 g (yield 97%) of 4-(4-n-pentyl-1-silacyclohexyl) chlorobenzene.

The obtained 4-(4-n-pentyl-1-silacyclohexyl) chlorobenzene was then added to a mixture of 0.5 g of magnesium (21 mmol) and 50 ml of THF to obtain Grignard reagent. This was added to an ether solution of 1.6 g of cyanogen $(CN)_2$ to obtain 4 -(4-n-pentyl-4-silacyclohexyl) benzonitrile. The product was a mixture of trans and cis isomers. They were separated by means of chromatography to obtain 4.5 g of the trans isomer (yield 90%).

$^1$H-NMR (100 MHz, CDCl$_3$) δ:

0.30 (s, 3H), 0.75–1.00 (m, 7H), 1.10–1.40 (m, 10H), 1.60–2.10 (m, 3H), 7.60 (s, 4H) ppm IR (liquid film) $v_{max}$: 2924, 2229, 1385, 1252, 1101, 985, 810 and 775 cm$^{-1}$.

[Example 24]

4-(trans-4-n-propyl-1-methyl-1-silacyclohexyl) benzonitrile

C—I transition temperature: 36° C.

IR (liquid film) $v_{max}$: 2910, 2229, 1385, 1252, 1101, 972, 812 and 775 cm$^{-1}$.

[Example 25]

4-(trans-4-n-butyl-1-methyl-1-silacyclohexyl) benzonitrile

C—I transition temperature: 25° C.

IR (liquid film) $v_{max}$: 2922, 2229, 1385, 1252, 1101, 980, 810 and 768 cm$^{-1}$.

[Example 26]

Preparation of 4-(trans-4-isopentyl-1-silacyclohexyl)-1-trifluoromethylbenzene 4.5 g (20 mmol) of 4-bromo-1-trifluoromethylbenzene was dropped into a mixture of 0.5 g of magnesium (21 mmol) and 50 ml of THF to obtain Grignard reagent. This solution was then dropped into a 50 ml THF solution of 4.1 g (20 mmol) of 4-isopentyl-1-chloro-1-silacyclohexane to obtain 4-(4-isopentyl -1-silacyclohexyl)-1- trifluoromethylbenzene. The product was a mixture of trans and cis isomers. They were separated by means of chromatography to obtain 5.8 g of the trans isomer (yield 92%).

The following compound was obtained in the same manner as Example 26.

[Example 27]

4-(trans-4-methoxypentyl-1-silacyclohexyl)-1-difluoromethoxybenzene

The compounds of this invention obtained in the examples described above were added to existing liquid crystal compositions to prepare liquid crystal compositions of this invention. For the obtained liquid crystal compositions, the threshold voltage and the viscosity at −20° C. were measured.

[Example of the liquid crystal composition]

A mixture A which comprises 40 mole % of 4-(4-(trans-4-ethylcyclohexyl)-trans-4-cyclohexyl)-1,2-difluorobenzene, 35 mole % of 4-(4-(trans-4-n-propylcyclohexyl)-trans-4-cyclohexyl) -1,2-difluorobenzene and 25 mole % of 4-(4-(trans-4-n-pentylcyclohexyl) -trans-4-cyclohexyl)-1,2-difluorobenzene shows characteristics listed below.

C—N transition temperature: 7° C.

N—I transition temperature: 106° C.

Threshold voltage: 2.50 V

Viscosity (20° C.): 26 cp

A mixture which comprises 85% of this mixture A and 15 mole % of 4-(trans-4-n-hexyl-4-silacyclohexyl)-1-fluorobenzene obtained in Example 8 shows characteristics listed below.

C—N transition temperature: 2° C.

N—I transition temperature: 81° C.

Threshold voltage: 2.30 V

Viscosity (20° C.): 19.7 cp

The silacyclohexane compounds of this invention have a tendency to show an enantiotropic phase transition when their substitutional group X is CN. When the substitutional group X is not CN, most of them show a monotropic phase transition or a crystal-isotropic liquid type transition, and do not show the electro-optical characteristics of liquid crystals when used alone. However, they contribute to a reduction in the viscosity and a lowering of the melting point when used with other liquid crystal compounds in a liquid crystal composition.

By using the liquid crystal compounds of this invention which have Si as a ring composing element as components of a liquid crystal composition, reduction of the viscosity, improvement of the response time and improvement of mutual solubility in low temperatures can be achieved.

Also, liquid crystal compounds whose X in the general formula (I) is neither R nor OR have, in addition to the advantages mentioned above, an effect of lowering the threshold voltage because of a greater dielectric anisotropy.

The liquid crystal compound whose substitutional group X in the general formula (I) is R or OR has near-zero dielectric anisotropy, and therefore it should preferably be used for the liquid crystal phase for display based on the dynamic scattering (DS) or deformation of aligned phase (DAP mode). The compounds in which X is other than R or OR should preferably be used for manufacturing the liquid crystal phase with a large positive dielectric anisotropy which is used in display elements based on the twisted nematic cell or the cholesteric-nematic phase transition.

We claim:

1. A silacyclohexane compound represented by the following general formula (I):

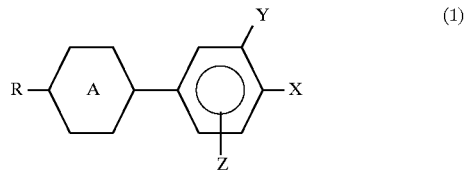

wherein R denotes a linear-chain alkyl group with 1–10 carbon atoms, a branched-chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms,

is trans-1-silacyclohexylene or trans-4-silacyclohexylene group whose silicon at position 1 or position 4 has a substitutional group(s) of H, F, Cl or $CH_3$, X denotes a R, OR, CN, F, Cl, $CF_3$, $CF_2$ Cl, CHFCl, $OCF_3$, $OCHF_2$, $OCF_2Cl$, $OCHF_2Cl$, —(O)$_m$—$CY_1$=$CX_1X_2$ (m denotes 0 or 1, $Y_1$ and $X_1$ respectively denote H, F or Cl, and $X_2$ denotes F or Cl.) or —O—$C_rF_sH_{2r+1-s}$ (r denotes an integral of 2 to 4 and s denotes an integral of 1 to 7.) group, Y denotes H or F, and Z denotes H or F.

2. A silacyclohexane compound as described in claim 1 wherein said compound is used as a component in a liquid crystal composition.

3. A liquid crystal composition characterized by containing the compound as described in claim 1.

4. A liquid crystal display element comprising the liquid crystal composition of claim 3.

5. A method of preparing a silacyclohexane compound:

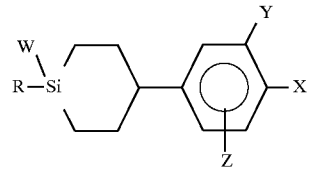

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a H, F, Cl or $CH_3$ group, X denotes a R, OR, CN, F, Cl, $CF_3$, $CF_2$, CHFCl, $OCF_3$, $OCHF_2$, $OCF_2$, $OCF_2Cl$, $OCHF_2Cl$, —(O)$_m$—$CY_1$=$CX_1X_2$ (m denotes 0 or 1, $Y_1$ and $X_1$ respectively denote H, F or Cl, and $X_2$ denotes F or Cl) or —O—$C_rF_sH_{2r+1-s}$ (r denotes an integral of 2 to 4 and s denotes an integer of 1 to 7) group, Y denotes H or F, and Z denotes H or F;

comprising reacting an organometallic reagent:

R—M where M denotes MgP, ZnP or Li, and P denotes a halogen atom with a silacyclohexane compound:

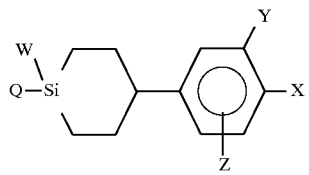

wherein Q denotes a halogen or alkoxy group.

6. A method of preparing a silacyclohexane compound:

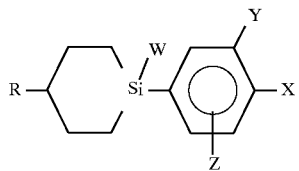

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a H, F, Cl or $CH_3$ group, X denotes a R, OR, CN, F, Cl, $CF_3$, $CF_2$, CHFCl, $OCF_3$, $OCHF_2$, $OCF_2$, $OCF_2Cl$, $OCHF_2Cl$, $-(O)_m-CY_1=CX_1X_2$ (m denotes 0 or 1, $Y_1$ and $X_1$ respectively denote H, F or Cl, and $X_2$ denotes F or Cl) or $-O-C_rF_sH_{2r+1-s}$ (r denotes an integral of 2 to 4 and s denotes an integer of 1 to 7) group, Y denotes H or F, and Z denotes H or F;

comprising reacting an organometallic reagent:

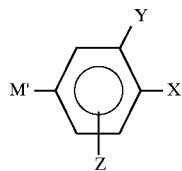

wherein M' denotes MgP', ZnP' or Li, and P' denotes a halogen atom with a silacyclohexane compound:

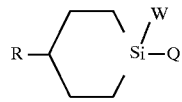

wherein Q denotes a halogen or alkoxy group.

7. A method of preparing a silacyclohexane compound:

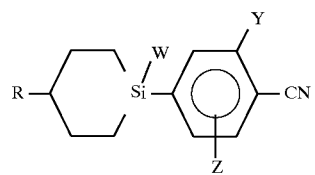

wherein R denotes a linear-chain alkyl group with 1–10 carbon atoms, a branched chain alkyl group with 3–8 carbon atoms, a mono- or di-fluoroalkyl group with 1–10 carbon atoms, an alkoxyalkyl group with 2–7 carbon atoms, or an alkenyl group with 2–8 carbon atoms, W denotes a H, F, Cl or $CH_3$ group, Y denotes H or F, and Z denotes H or F;

comprising reacting an organometallic reagent:

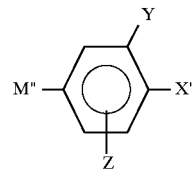

wherein M" denotes MgP", ZnP" or Li, P" denotes a Br or I atom, and X' denotes a halogen atom with a silacyclohexane compound:

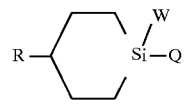

wherein Q denotes a halogen or alkoxy group to obtain a phenylsilacyclohexane compound:

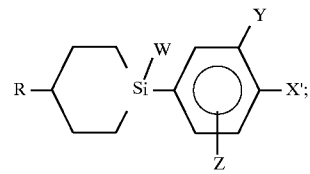

forming a Grignard reagent:

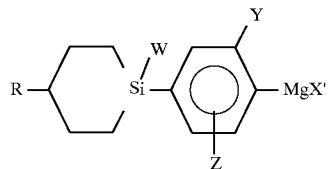

from said phenylsilacyclohexane compound by applying Mg thereto; and reacting a cyanation reagent:

T—CN wherein T denotes a halogen or a cyano group with said Grignard reagent.

* * * * *